United States Patent Office 3,235,107
Patented Feb. 15, 1966

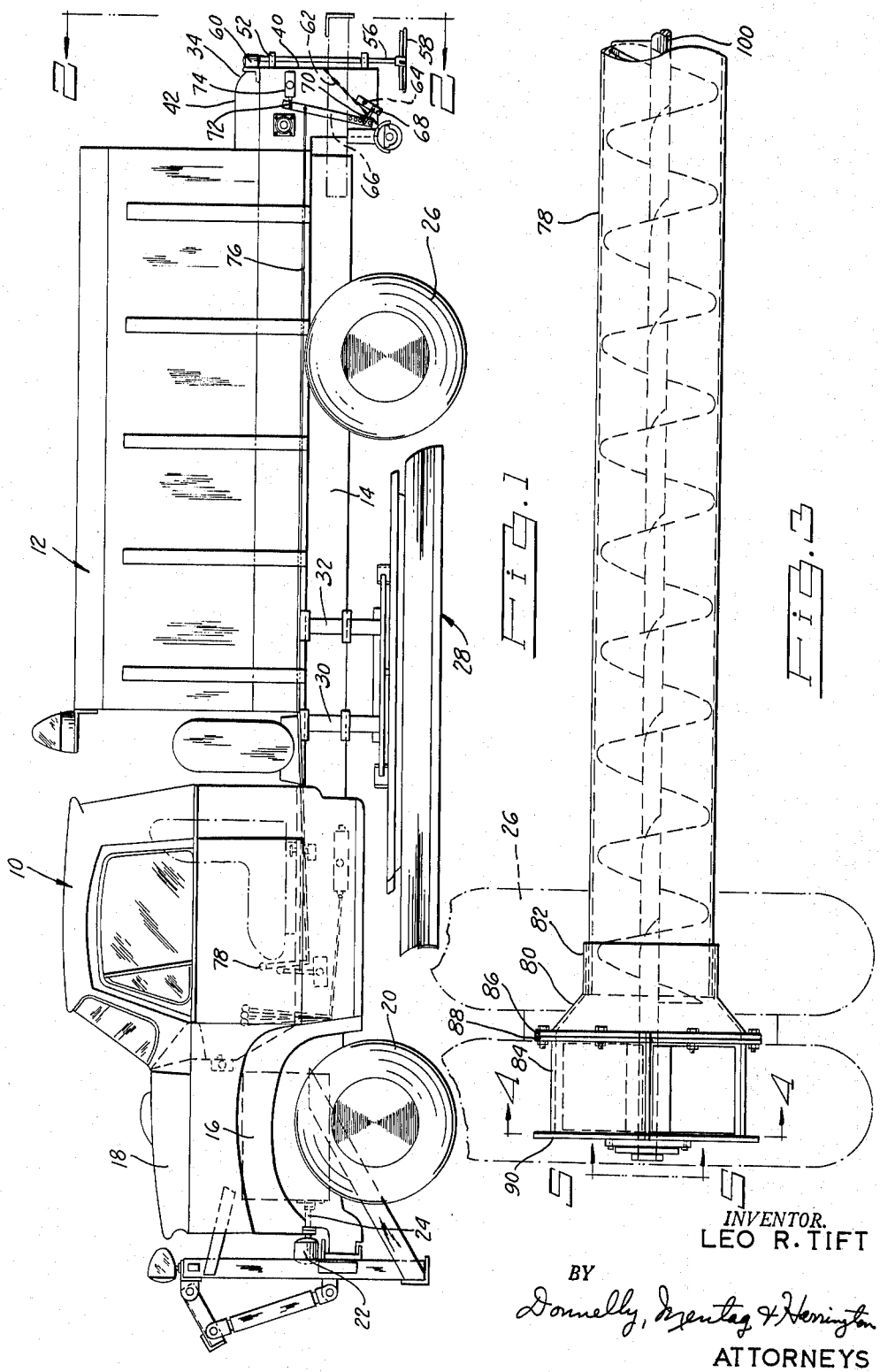

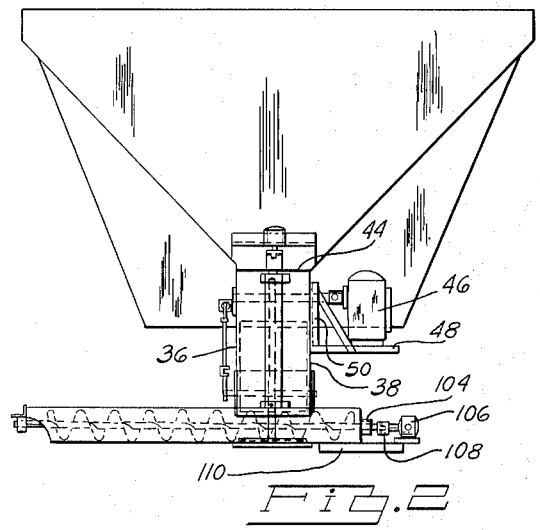
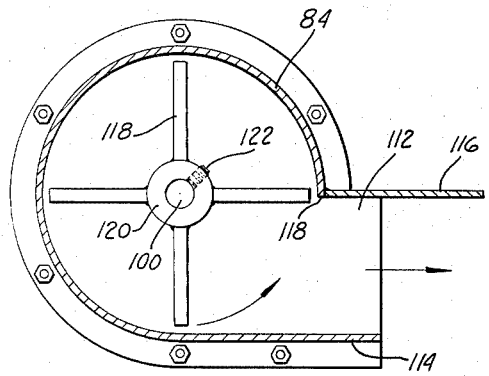
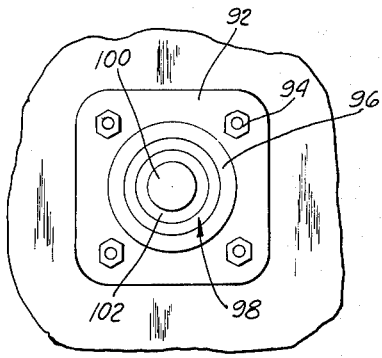

3,235,107
MATERIAL SPREADER FOR HIGHWAY USE
Leo R. Tift, Hastings, Mich., assignor to James M. Hare, Secretary of State, State of Michigan
Filed June 3, 1963, Ser. No. 284,939
1 Claim. (Cl. 214—519)

My invention relates generally to improvements in an auger type material spreader mechanism for use with highway maintenance vehicles, and more particularly to a mobile material spreader mechanism wherein provision is made for maintaining a controlled distribution of the material on the highway when the vehicle is in motion. I contemplate that either salt or sand may be accommodated by my improved spreader mechanism.

I am aware of various conventional auger type spreader devices for distributing sand or salt on highways. These normally comprise an auger housing situated horizontally on a transverse axis with respect to the centerline of the vehicle. Salt or sand is fed into the auger mechanism by means of a conveyor and distributed transversely through a discharge opening that is located relatively close to the highway centerline when the vehicle is in operation.

The salt or sand normally is discharged from the open end of the auger housing and dropped on the highway. The forward motion of the material is equal to the velocity of the truck as the material strikes the highway, and for this reason the distribution of the material is uncontrolled and will assume a haphazard distribution pattern.

It is an object of my invention to provide a mechanism that will establish a more controlled distribution of the material as it is dropped onto the highway by compensating for the forward motion of the vehicle.

It is a further object of my invention to provide an auger type spreader wherein provision is made for discharging the material from the discharge end of the auger so that the velocity of the discharge with respect to the truck will be in a direction that is opposite to the direction of the motion of the truck.

It is a further object of my invention to provide a bladed rotor at the discharge end of an auger which is driven by an auger motor about an axis that is common to the axis of the auger, and wherein the blades of the rotor are capable of directing the material in a rearward direction with respect to the direction of motion of the vehicle.

Other objects and features of my invention will become apparent from the following description and from the accompanying drawings wherein:

FIGURE 1 shows a side elevation view of a spreader truck with which my improved mechanism can be used, FIGURE 2 is the rear view of the structure of FIGURE 1, taken along the plane of section line 2—2 of FIGURE 1;

FIGURE 3 is an assembly view of my improved auger mechanism,

FIGURE 4 is a cross-sectional view taken along section line 4—4 of FIGURE 3, and FIGURE 5 is a view taken along the plane of section line 5—5 of FIGURE 3.

Referring first to FIGURE 1, numeral 10 designates the cab of a spreader truck and numeral 12 designates a V-shaped body which functions as a reservoir for material such as salt or sand.

The truck includes a chassis having a frame 14 upon which the body 12 is mounted. The frame also supports a vehicle engine 16 located within an engine compartment 18. The forward dirigible wheels of the truck are shown at 20 and they are mounted upon the chassis by means of a conventional suspension system.

A fluid pump 22 is directly coupled by means of a driveshaft 24 to the crankshaft of the engine 16. This pump serves as a fluid pressure source for the fluid motors which power the auger mechanism of my invention and an associated spinner disc. These motors will be described subsequently.

The traction wheels for the truck are shown at 26. Mounted between the wheels 20 and 26 is a scraper blade and a plow assembly generally indicated by reference character 28. These are supported by mounting structures 30 and 32 carried by the frame 14.

At the rearward end of the body 12 there is located a chute 34. This includes a pair of side panels 36 and 38 and a rear panel 40. An upper closure plate 42 completes an enclosure which communicates with the interior of the body 12 through a gate mechanism of conventional construction. Material is conveyed through the gate opening to the chute 34 by means of a conveyor mechanism not shown. This mechanism circulates horizontally in an endless fashion along the base 44 of the body 12 and may be powered by a chain and sprocket drive in a conventional fashion. This drive in turn is powered by a power output member of a reduction gear unit 46 which in turn is powered by a fluid motor. The speed of the motor for the conveyor can be controlled by the vehicle operator by means of an appropriate adjusting valve mechanism situated in a fluid circuit that connects pump 22 to the motor.

Reduction gear unit 46 is supported upon brackets 48 and 50, which in turn are secured to the side panel 38 of the chute 34.

Supported upon the rear panel 40 are brackets 52 and 54 which provide a journal for a spinner disc shaft 56. A spinner disc 58 is connected to the shaft 56. A fluid motor 60 powers the shaft 56 thereby causing spinner disc 58 to rotate about a vehicle axis. The motor 60 is situated in a fluid circuit of which the pump 22 forms a part. The speed of the motor 60 can be controlled by the vehicle operator from within the cab by making an appropriate adjustment in valve structure located within the circuit.

As the material is conveyed into the chute 34 by the conveyor, it falls downwardly under gravity and is deflected by a guide plate 62 in a generally forward direction. This guide plate is pivotally mounted upon a shaft 64 and has a width that is substantially equal to the spacing between the panels 36 and 38. The angularity of the plate 62 can be controlled by means of levers 66 and 68, the latter being joined to the shaft 64 on the outer side of the panel 36. The levers are linked together by a motion transmitting link 70.

Lever 66 is pivoted at 72 to a selector valve 74 which in turn is secured to the side panel 36.

The lever 66 can be oscillated in either a clockwise direction or a counter clockwise direction, as viewed in FIGURE 1, by means of the control rod 76 which extends longitudinally with respect to the centerline of the vehicle. It terminates within the cab, and its position can be adjusted by means of a driver-operated control lever 78. By manipulating the lever 78, rod 76 can be adjusted in either a forward or an aft direction. This in turn causes the plate 62 to assume either the position shown in FIGURE 1 or a position that is displaced in a counter clockwise direction.

When the plate 62 assumes a counter clockwise position, it is capable of distributing the material onto the upper surface of the spinner disc 58. If the motor 60 is in operation, the material then is distributed over the highway in a wide pattern.

If the plate 62 assumes the position shown in FIGURE 1, it is directed into the auger mechanism which I now will describe.

The auger includes a cylindrical housing 78 that is secured to the base of chute 34. The lower end of chute 34 is open and the portion of the housing 78 in the region of the open end is provided with an aperture for receiving the material that is directed toward the auger by the plate 62.

The cylindrical housing 78 extends transversely with respect to the centerline of the vehicle. Located at the left hand end of the auger housing 78 is a flanged rotor housing portion 80 which includes a cylindrical sleeve 82 received over the end of the cylindrical housing 78.

A drum-like rotor housing portion 84 is bolted to the portion 80. Each portion 80 and 84 is provided with a flange as shown at 86 and 88 respectively to facilitate a bolted connection.

Closure plate 90 is secured to the open end of the drum portion 84. It is provided with a bearing plate 92 that is bolted in place by means of bolts 94. Plate 92 carries a sleeve retainer 96. A bushing, generally identified by reference character 98, rotatably supports one end of an auger shaft 100. A retainer shoulder 102 can be carried by the shaft 100 to hold the same axially fast with respect to the auger housing.

Shaft 100 extends through the auger housing 78 and is journalled by means of a suitable bearing 104, as shown in FIGURE 2. Shaft 100 is drivably coupled to a fluid motor 106 by means of a coupling shaft 108. Motor 106 is supported upon housing 78 by means of a bracket 110.

As best seen in FIGURE 4, the drum shaped rotor housing portion 84 is formed with an opening 112 which may provide a tangentially disposed passage for the discharge of the material. The portion 84 includes a tangentially situated discharge portion 114 which forms a guide for the material. A companion guide plate 116 is connected to the portion 84 at the margin 118 of the opening 112.

Secured to shaft 100 are radially disposed rotor blades 118 that are carried by a hub 120. The hub 120 in turn is held fast upon the shaft 100 by means of a set screw 122. The blades 118 are substantially equal in width to the width of the drum portion 84 although sufficient clearance is provided to avoid interference.

As the shaft 100 is driven by the motor 106, the blades 118 rotate in a counter clockwise direction as seen in FIGURE 4. When the spreader is in operation, the salt or sand is distributed to the flanged rotor housing portion 80, and then is distributed into the region of the housing portion 84. The blades 118 which define the rotor then force the material through the tangential opening 112 which is directed rearwardly with respect to the direction of motion of the vehicle. The tangential velocity thus imparted to the material reduces the absolute velocity of the material with respect to the pavement while the truck is in motion.

The forward motion of the material, as it is dropped on the highway, thus is reduced by the amount of the velocity that is imparted to the material by the rotor. The material then remains in place along a desired path and is not distributed in a haphazard pattern by reason of the effect of the forward velocity of the vehicle.

Having thus described a preferred embodiment of my invention, what I claim and desire to secure by U.S. Letters Patent is:

A road conditioning material spreader for a highway spreader truck comprising an auger housing carried by said truck, an auger blade situated within the housing, means for powering said auger blade to transfer material through the auger housing, a rotor housing secured to the discharge end of said auger housing, radially disposed rotor blades mounted for rotation within said rotor housing, means for connecting said rotor blades to said auger blade, and a tangential opening formed in said rotor housing, said opening facing rearwardly with respect to the direction of the motion of said truck, said rotor housing comprising a drum-shaped portion and a portion that is flanged radially outwardly, the radially outward ends of said rotor blades being disposed in close proximity to the inner peripheral margin of said drum-shaped portion, said drum-shaped portion and said flanged portion being secured together at their respective margins whereby the ends of said rotor blades, when they are positioned adjacent said opening, are closer to the surface of the road than the radially outward margin of said auger blade.

References Cited by the Examiner

UNITED STATES PATENTS

| | | | |
|---|---|---|---|
| 2,837,228 | 6/1958 | Kaster | 214—83.32 X |
| 2,871,643 | 2/1959 | McClellan | 56—24 |
| 2,956,809 | 10/1960 | Huddle et al. | 214—83.32 X |
| 3,018,908 | 1/1962 | Wilton et al. | 214—83.36 X |
| 3,056,521 | 10/1962 | Marr | 214—83.32 X |

GERALD M. FORLENZA, *Primary Examiner.*

HUGO O. SCHULZ, *Examiner.*